United States Patent
Rose et al.

(10) Patent No.: US 10,985,507 B2
(45) Date of Patent: Apr. 20, 2021

(54) PLUG CONNECTOR PART HAVING A TEMPERATURE-MONITORING DEVICE

(71) Applicant: PHOENIX CONTACT E-MOBILITY GMBH, Schieder-Schwalenberg (DE)

(72) Inventors: Markus Rose, Paderborn (DE); Marco Seelig, Leopoldshoehe (DE); Dirk Moseke, Hoexter-Luechtringen (DE); Christian Sander, Doerentrup (DE)

(73) Assignee: PHOENIX CONTACT E-MOBILITY GMBH, Schieder-Schwalenberg (DE)

( * ) Notice: Subject to any disclaimer, the term of this patent is extended or adjusted under 35 U.S.C. 154(b) by 0 days.

(21) Appl. No.: 16/607,104

(22) PCT Filed: Apr. 16, 2018

(86) PCT No.: PCT/EP2018/059643
§ 371 (c)(1),
(2) Date: Oct. 22, 2019

(87) PCT Pub. No.: WO2018/197247
PCT Pub. Date: Nov. 1, 2018

(65) Prior Publication Data
US 2020/0381874 A1     Dec. 3, 2020

(30) Foreign Application Priority Data
Apr. 24, 2017 (BE) .................................. 2017/5284

(51) Int. Cl.
*H01R 13/66*     (2006.01)
*H01R 13/11*     (2006.01)
*H01R 24/76*     (2011.01)

(52) U.S. Cl.
CPC ....... *H01R 13/6683* (2013.01); *H01R 13/111* (2013.01); *H01R 24/76* (2013.01); *H01R 2201/26* (2013.01)

(58) Field of Classification Search
CPC .... H01R 13/6683; H01R 13/111; H01R 24/76
(Continued)

(56) References Cited

U.S. PATENT DOCUMENTS 5,188,542 A * 2/1993 Ballman ................ H01R 13/58
                                                                                                   439/465
5,742,464 A * 4/1998 Ceola .................. H01R 13/7137
                                                                                                  361/103
(Continued)

FOREIGN PATENT DOCUMENTS

DE       3935680 A1    5/1991
DE   112014003014 T5    3/2016
(Continued)

*Primary Examiner* — Alexander Gilman
(74) *Attorney, Agent, or Firm* — Leydig, Voit & Mayer, Ltd.

(57) ABSTRACT

A connector part for connecting to a mating connector part includes: a housing part; an electrical contact element arranged on the housing part for making electrical contact with the mating connector part; and a temperature monitoring device having a sensor device for detecting a heating on the contact element. The temperature monitoring device includes a carrier element which extends flatly along a plane, on which the sensor device is arranged, and which has two clip arms via which the carrier element is clippable onto the contact element.

16 Claims, 12 Drawing Sheets

(58) Field of Classification Search
USPC .......................................................... 439/620
See application file for complete search history.

(56) References Cited

U.S. PATENT DOCUMENTS

| | | | |
|---|---|---|---|
| 6,210,036 B1 | 4/2001 | Eberle et al. | |
| 7,005,591 B1 * | 2/2006 | Fleury | H01R 13/5213 |
| | | | 200/51 R |
| 8,325,454 B2 | 12/2012 | Brugner et al. | |
| 8,605,402 B2 * | 12/2013 | Ward | G01K 3/005 |
| | | | 361/103 |
| 9,570,862 B2 | 2/2017 | Kawai et al. | |
| 10,530,101 B2 | 1/2020 | Rose et al. | |
| 2017/0077656 A1 * | 3/2017 | Beideman | H01R 13/7137 |
| 2017/0229820 A1 * | 8/2017 | Fuehrer | H01R 13/6683 |
| 2017/0237205 A1 * | 8/2017 | Fuehrer | B60L 3/0023 |
| | | | 439/620.22 |
| 2018/0097316 A1 * | 4/2018 | Rose | H01R 13/6683 |

FOREIGN PATENT DOCUMENTS

| | | |
|---|---|---|
| DE | 102015106251 A1 | 10/2016 |
| EP | 2605339 A1 | 6/2013 |
| GB | 2489988 A | 10/2012 |
| WO | WO 2016169940 A1 | 10/2016 |

\* cited by examiner

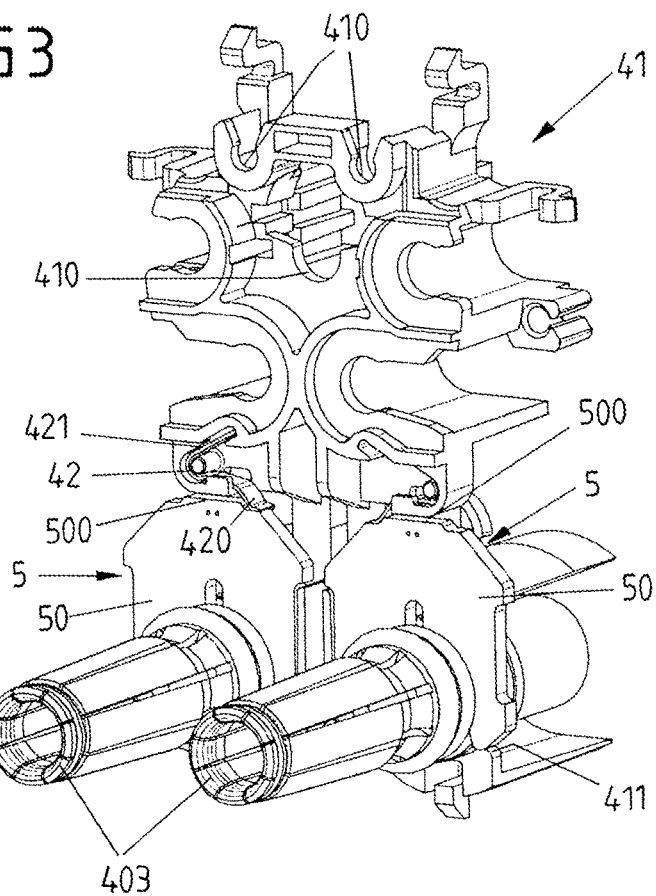
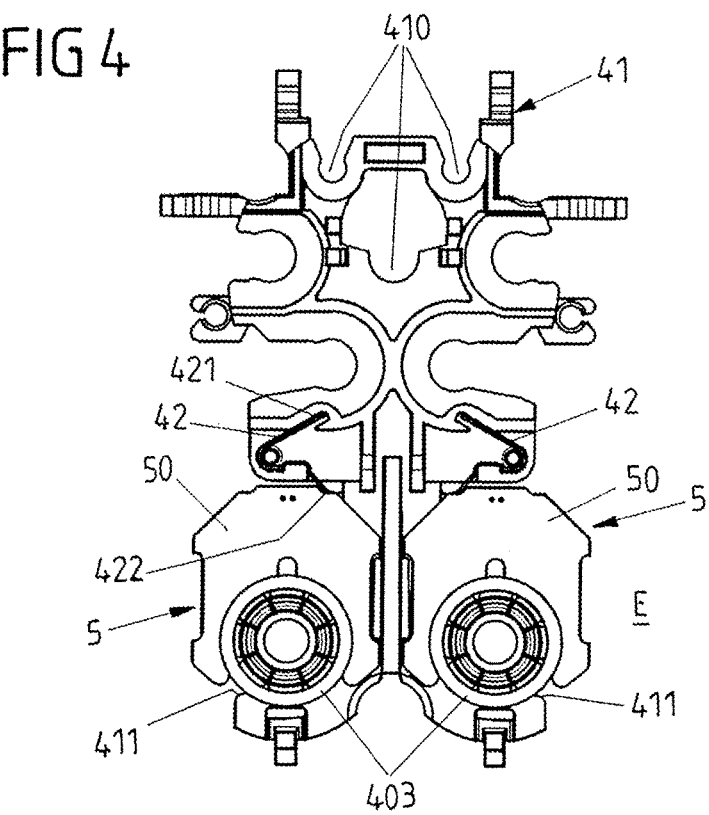

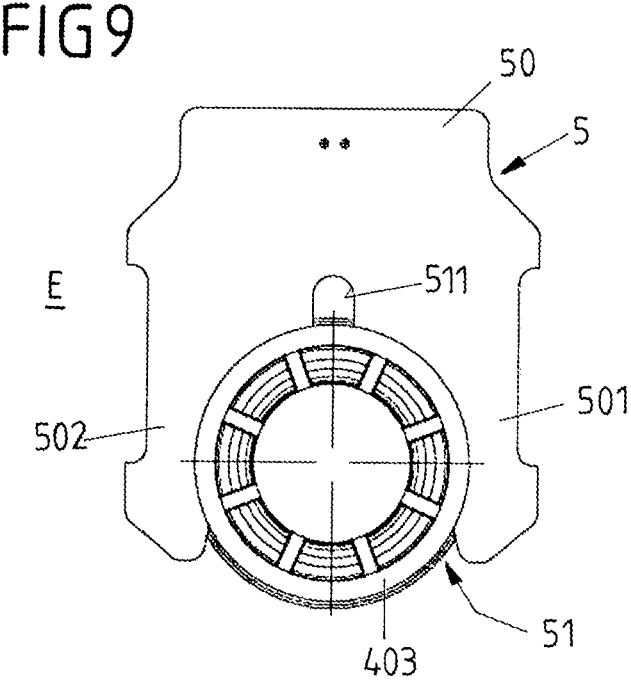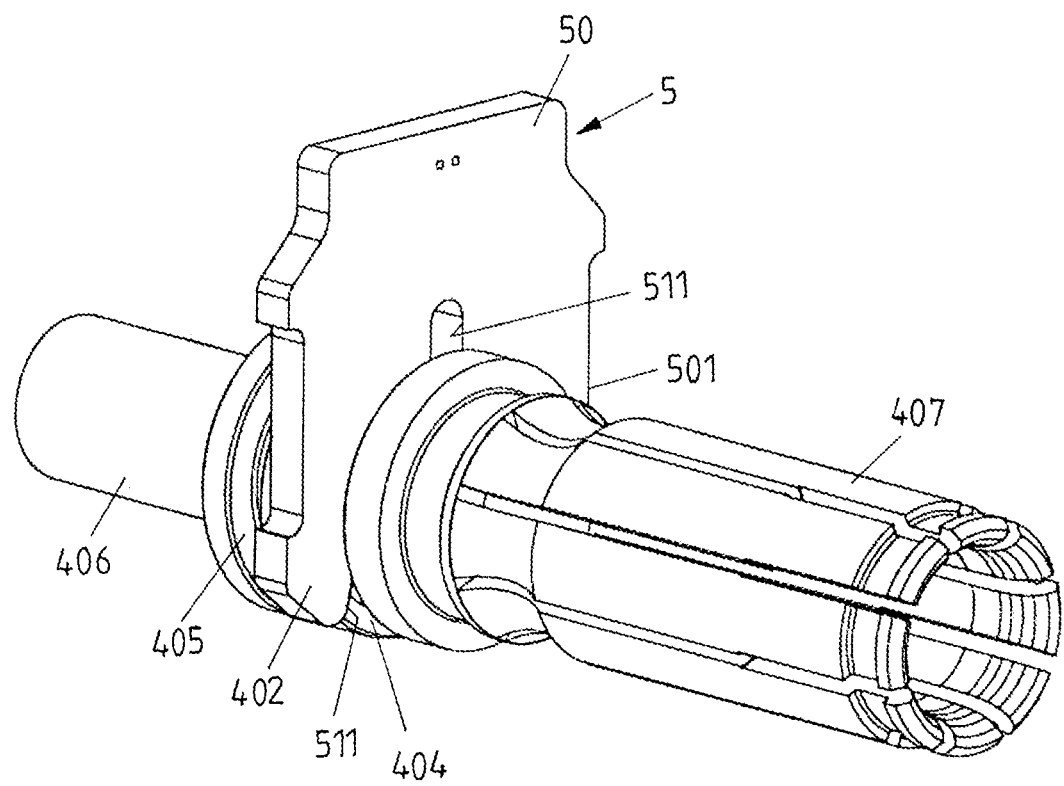

PLUG CONNECTOR PART HAVING A TEMPERATURE-MONITORING DEVICE

CROSS-REFERENCE TO PRIOR APPLICATIONS

This application is a U.S. National Phase application under 35 U.S.C. § 371 of International Application No. PCT/EP2018/059643, filed on Apr. 16, 2018, and claims benefit to Belgian Patent Application No. BE 20175284, filed on Apr. 24, 2017. The International Application was published in German on Nov. 1, 2018 as WO/2018/197247 under PCT Article 21(2).

FIELD

The invention relates to a connector part for connecting to a mating connector part.

BACKGROUND

Such a connector part comprises a housing part, an electrical contact element arranged on the housing part for establishing an electrical contact with the mating connector part, and a temperature monitoring device having a sensor device for detecting heating at the contact element.

Such a connector part can be a male as well as a female connector part. Such a connector part can be used in particular on a charging device for transmitting a charging current. The connector part can in particular be designed as a charging plug or charging socket for charging an electric motor-driven motor vehicle (also referred to as an electric vehicle) and can be used on the side of a charging station, e.g. as a charging plug on a charging cable, or on the side of a vehicle as a so-called inlet.

Charging plugs or charging sockets for charging electric vehicles are to be designed in such a way that charging currents can be transmitted. Since the thermal dissipation increases quadratically with the charging current and in addition it is prescribed that a temperature increase at a plug connector part must not exceed 50 K, it is necessary with such charging plugs or charging sockets to provide temperature monitoring in order to detect an overheating at components of the charging plug or charging socket at an early stage and, if necessary, to modify the charging current or even switch off the charging device.

In a charging plug known from EP 2 605 339 A1, a temperature sensor is arranged on an insulating body approximately in the center between contact elements of the contact plug. Via the temperature sensor, it can be detected whether there is any excessive heating somewhere on the contact elements in order to cause the charging process to be switched off, if necessary.

In a charging plug known from GB 2 489 988 A, a plurality of temperature sensors are provided which transmit temperature data via a line.

Depending on the temperature range in which the temperatures recorded at the temperature sensors are located, a charging process is controlled.

From U.S. Pat. No. 6,210,036 B1 a connector is known in which several temperature sensors are serially interlinked via a single-core cable. The temperature sensors are arranged on an insulating body and exhibit a significant change in resistance at a predetermined temperature which is such that a control circuit connected to the line can detect the change and adjust the current flow through the charging plug and, if necessary, switch it off.

U.S. Pat. No. 8,325,454 B2 discloses a plug in which thermistors are assigned to individual contacts, which are connected in parallel to one another and switch on a thyristor when a threshold temperature is exceeded, in order in this way to switch off a current flow through the contacts.

In charging plugs known from the prior art, temperature sensors are embedded in particular in an insulating body. This is necessary in order to electrically insulate the temperature sensors from the contact elements at which heating can occur. At the same time, this has the disadvantage that a temperature change at one of the contact elements is transmitted via the insulating body with a time delay and is thus perceived at the temperature sensors with a time delay. Especially with concepts which are supposed to enable a fast switch-off of a load circuit in the event of a fault, such arrangements of temperature sensors are therefore possibly unsuitable.

There is a need for a temperature monitoring device which can be simple and cost-effective in design and allows temperature monitoring on the contact elements with a fast response behavior for rapid initiation of countermeasures, such as a fast switch-off of a charging current.

In a connector part known from DE 10 2015 106 251 A1, contact elements are arranged in openings in a circuit board. One or more sensor devices are provided on the circuit board and serve to detect heating at one or more contact elements.

SUMMARY

In an embodiment, the present invention provides a connector part for connecting to a mating connector part, comprising: a housing part; an electrical contact element arranged on the housing part configured to make electrical contact with the mating connector part; and a temperature monitoring device comprising a sensor device configured to detect a heating on the contact element, wherein the temperature monitoring device further comprises a carrier element which extends flatly along a plane, on which the sensor device is arranged, and which has two clip arms via which the carrier element is clippable onto the contact element.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 3 a view of an assembly of the connector part comprising a contact carrier having contact elements disposed thereon;

FIG. 4 a frontal view of the assembly according to FIG. 3;

FIG. 9 a frontal view of the contact element with the temperature monitor device attached;

FIG. 10 a perspective view of the arrangement according to FIG. 9;

DETAILED DESCRIPTION

Figure 1:
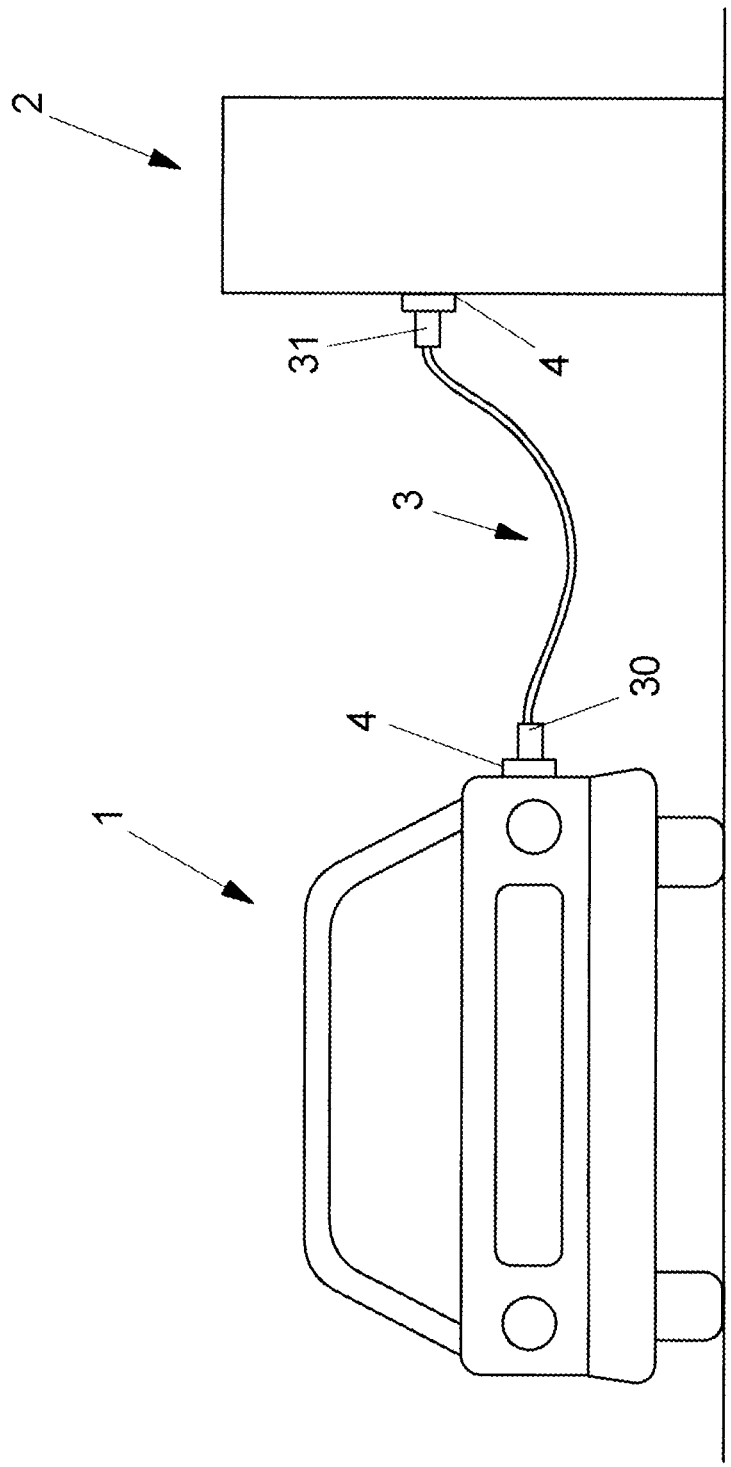
FIG. 1 a schematic representation of an electric vehicle with a charging cable and a charging station for charging.

In an embodiment, the present invention provides a connector part which enables temperature monitoring with fast response behavior and simple construction in a simple and cost-effective manner.

Accordingly, the temperature monitoring device has a carrier element extending flatly along a plane, on which the sensor device is arranged and which has two clip arms via which the carrier element is clipped onto the contact element.

The carrier element can be embodied, for example, as a circuit board carrying electrical conductor tracks, for example on a carrier body consisting of an electrically insulating material. Alternatively, however, the carrier element can also be realized by a so-called metal core circuit board.

The fact that the carrier element is clipped onto the contact element makes it particularly easy to mount the temperature monitoring device on an assigned contact element. A separate temperature monitoring device can be assigned to each contact element of the connector part, the temperature monitoring device being clipped via its clip arms onto the respectively associated contact element and thereby fastened to the contact element.

The clip arms are preferably formed integrally with the carrier element. Thus, the clip arms are molded onto the carrier element and are sufficiently elastic, so that the carrier element can be clipped onto the associated contact element and held in the clipped-on position on the contact element.

The carrier element is designed symmetrically, for example, with an axis of symmetry located in the plane along which the carrier element extends.

The clip arms preferably form an opening between them, which has an edge region which extends along a circular arc and surrounds the contact element. Because the contact element extends through the opening of the carrier element formed between the clip arms and is in contacting contact with the edge area of the opening, the contact element is in planar contact with the carrier element and thus thermally coupled to the carrier element, so that the sensor device arranged on the carrier element can detect heating on the contact element.

Because a sensor device can thus be located close to an assigned contact element, the sensor device can detect a heating of the contact element without large temporal latency, i.e. with rapid response behavior, so that the information about the heating can be quickly evaluated in order to initiate a suitable countermeasure, e.g. switching off a transmitted charging current.

The contact element advantageously extends perpendicularly through the opening of the carrier element formed between the clip arms. The carrier element extends flatly in the plane assigned to it, while the contact element is perpendicular to this plane.

In an advantageous embodiment, the edge region of the opening is covered at least partially by a metalization layer. The edge region is thus metalized with a (highly thermally conductive) metal material (e.g. copper) and is in planar contact via the metalization layer with the contact element to which the carrier element is attached, so that the temperature monitoring device is thermally coupled to the contact element via it.

The sensor device of the temperature monitoring device is preferably arranged sufficiently far away from the contact element on the carrier element, so that the sensor device (while maintaining the air and creepage distance required for insulation) is electrically insulated from the contact element. In order to enable a detection of a heating at the contact element without substantial delay, the carrier element preferably has a thermally conductive (metal) layer, for example a copper layer, which is contacted to the metalization layer at the edge region. The thermally conductive layer can, for example, be embedded in the base body and extend as far as the sensor device, preferably underneath the sensor device, within the carrier element. When the contact element is heated, the thermally conductive layer also heats up due to the contact element contacting the metalization layer at the edge region and the connection of the thermally conductive layer to the metalization layer. Since the sensor device can be arranged in immediate spatial proximity to the thermally conductive layer—with electrical insulation via the base body—the sensor device can immediately detect a heating of the thermally conductive layer and thus detect heating at the contact element.

In one embodiment, a first thermally conductive layer is arranged on a surface of the base body, and a second thermally conductive layer is embedded in the base body. The first thermally conductive layer and the second thermally conductive layer, which are each preferably formed from a highly thermally conductive metal material, for example copper, are preferably thermally connected to one another via so-called thermal vias, so that there is a thermal coupling between the thermally conductive layers, and the thermally conductive layers, each of which is contacted with the metalization layer at the edge region of the opening, thus heat up uniformly.

While the first thermally conductive layer on the surface of the carrier element, on which the sensor device is also arranged, is spaced apart by a distance from the sensor device and is thereby electrically insulated from the sensor device, the second thermally conductive layer extends within the base body preferably as far as below the sensor device and is electrically insulated from the sensor device via the base body. Heat is thus conducted via the second thermally conductive layer to the sensor device and can be detected at the sensor device.

A carrier element with different thermally conductive (metal) layers is realized, for example, by a circuit board in which the base body is made of an insulating material, for example FR4.

In an alternative embodiment, the carrier element can be realized by a so-called metal core circuit board which has a metal core, for example made of aluminum, and at least one electrically insulating layer covering the metal core completely or partially. In this case, the metal core of the metal core circuit board is electrically and thermally contacted with the contact element to which the temperature monitoring device is attached. The sensor device is electrically insulated from the metal core via an insulating layer, but is arranged in close spatial positional relation to the metal core, so that heating at the contact element is transferred via the metal core to the sensor device by thermal conduction and can be detected at the sensor device.

A design of a metal core circuit board is known from DE 39 35 680 A1, for example.

The clip arms, via which the temperature monitoring device is attached to the associated contact element, are sufficiently elastic in such a way that the temperature monitoring device can be clipped onto the associated contact element, with reliable support in the clipped-on position. In order to improve the elasticity at the clip arms and in particular to reduce a risk of breakage at the clip arms during repeated insertion, at least one relief recess can be provided on the carrier element, which locally weakens the carrier element, so that the clip arms can be sufficiently elastically deformed and the opening formed between the clip arms can be elastically expanded during insertion.

The relief recess can be formed, for example, within the carrier element. However, the relief recess can also extend from the opening formed between the clip arms and extend into the carrier element starting from the opening. The relief recess can be produced, for example, by milling and extends perpendicularly to the plane along which the carrier element extends, through the carrier element.

In one embodiment, the connector part has a contact carrier on which one or more contact elements are held and which is fastened to the housing part. Via the contact carrier with the contact elements arranged thereon, a pre-assembled subassembly is created which can be arranged and fastened to the housing part of the connector part. A temperature monitoring device is arranged on at least one contact element—preferably such contact elements which serve as power contacts for transmitting large (charging) currents—and is held above it on the contact carrier.

The temperature monitoring device is preferably clipped onto the associated contact element via the clip arms of the carrier element, but is not additionally fixedly connected to the contact carrier or the housing part. The temperature monitoring device is thus fixed only to the contact element, but not to the contact carrier and the housing part, so that a force effect on the contact element, for example when the connector part is plugged into an associated mating connector part, does not lead to a load on the temperature monitoring device, and in particular no (appreciable) forces are transmitted between the contact element and the contact carrier or the housing part via the carrier element of the temperature monitoring device.

In order to ensure a secure hold of the temperature monitoring device on the associated contact element, especially when heating occurs at the contact element and thus at the carrier element of the temperature monitoring device, the carrier element of the temperature monitoring device can be elastically supported against the contact carrier by means of a spring element, for example. The carrier element is thus not fixed to the contact carrier in a stationary manner, but is elastically supported relative to the contact carrier and is preloaded above it in such a way that the carrier element is pressed into contact with the contact element. If, for example, a (slight) deformation of the carrier element occurs due to heating at the contact element and at the carrier element, the carrier element is pressed into contact with the associated contact element via the biasing spring element and is thus in advantageous contact with the contact element, so that a thermal coupling between the contact element and the carrier element and also a mechanical hold of the carrier element on the contact element is ensured.

In one embodiment, the spring element is designed as a leg spring and is supported with a first leg on the carrier element and with a second leg on the contact carrier. Via its spring legs, the spring element brings about a biasing spring force between the contact carrier and the carrier element in the direction of the contact element, preferably in the plane in which the carrier element extends in a planar manner.

The connector part can be used, for example, as a charging plug or as a charging socket of a charging system for charging an electric vehicle. For this purpose, the connector part has contact elements which serve as load contacts for transmitting a charging current, for example in the form of a direct current or in the form of an alternating current. Temperature monitoring devices are preferably arranged on these load contacts, wherein in an advantageous embodiment each contact element is assigned its own temperature monitoring device. The sensor device of each temperature monitoring device is connected to a control device, for example, so that signals recorded via the temperature monitoring device can be evaluated and used for controlling a charging current transmitted via the load contacts.

Sensor devices of the type described here can be designed, for example, as temperature sensors, e.g. in the form of temperature-dependent resistors. Such temperature sensors can be, for example, resistors with a positive temperature coefficient (so-called PTC resistors) whose resistance value rises with increasing temperature (also referred to as PTC thermistors which have good electrical conductivity at low temperature and have a reduced electrical conductivity at higher temperatures). Such temperature sensors can, for example, also have a non-linear temperature characteristic and can be produced, for example, from a ceramic material (so-called ceramic PTC thermistors).

However, for example, it is also possible to use electrical resistors with a negative temperature coefficient (so-called NTC resistors) as temperature sensors, the resistance value of which decreases with increasing temperature.

Alternatively or additionally, temperature sensors formed by semiconductor components can also be used.

FIG. 1 shows in a schematic view a vehicle 1 in the form of an electric motor-driven vehicle (also referred to as an electric vehicle). The electric vehicle 1 has electrically chargeable batteries via which an electric motor for moving the vehicle 1 can be electrically supplied.

In order to charge the batteries of the vehicle 1, the vehicle 1 can be connected to a charging station 2 via a charging cable 3. For this purpose, the charging cable 3 can be plugged with a charging plug 30 at one end into an assigned mating connector part 4 in the form of a charging socket of vehicle 1 and is electrically connected at its other end via another charging plug 31 with a connector part 4 in the form of a charging socket at charging station 2. Charging currents with comparatively high amperage are transmitted to vehicle 1 via the charging cable 3.

Figure 2:
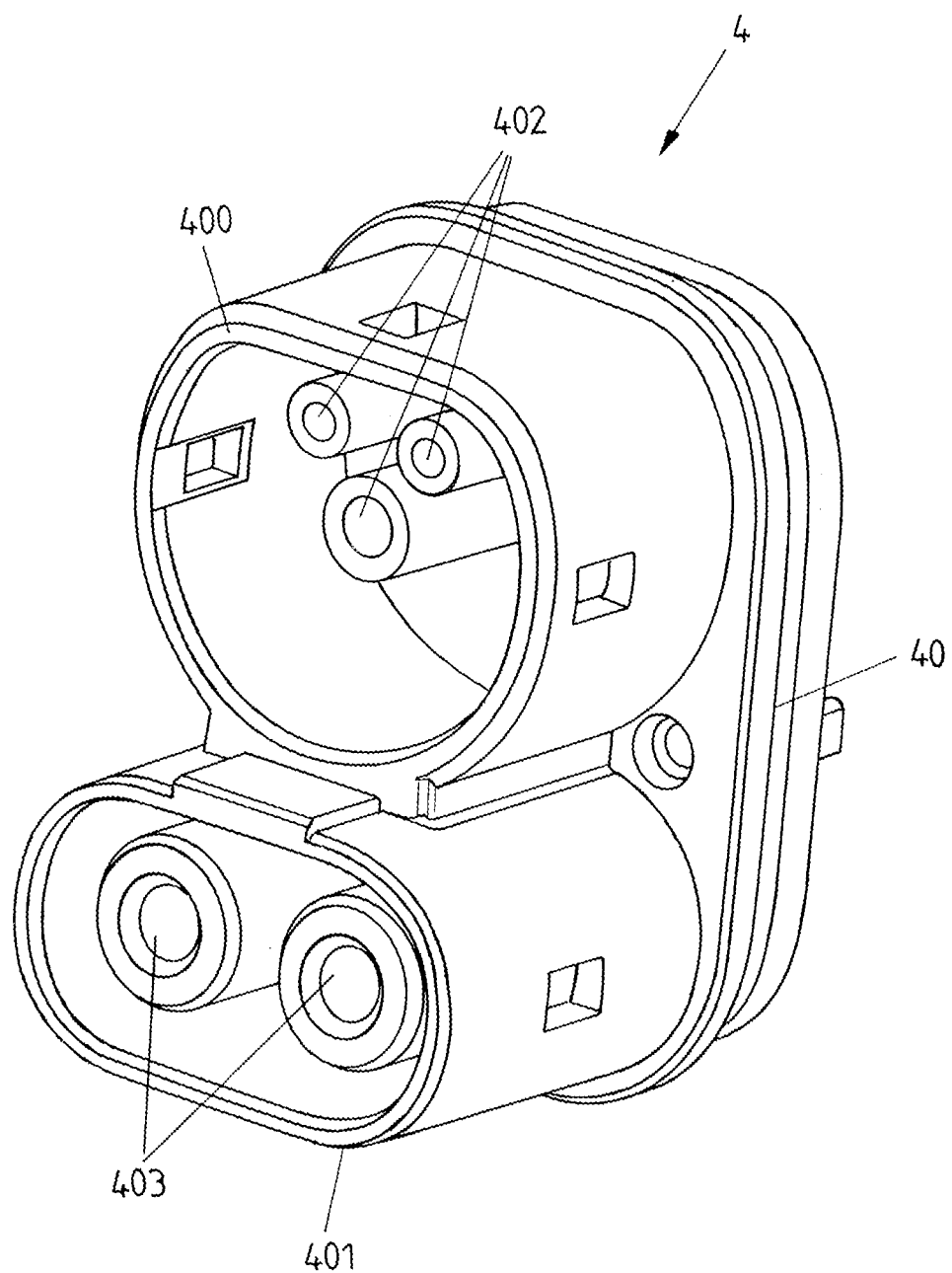
FIG. 2 a view of a connector part in the form of an inlet on a vehicle side.
Figure 5:
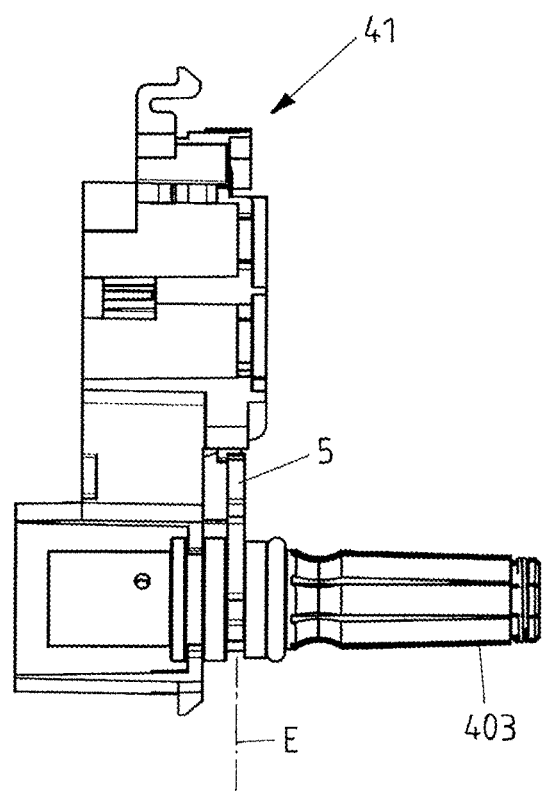
FIG. 5 a side view of the assembly.
Figure 6:
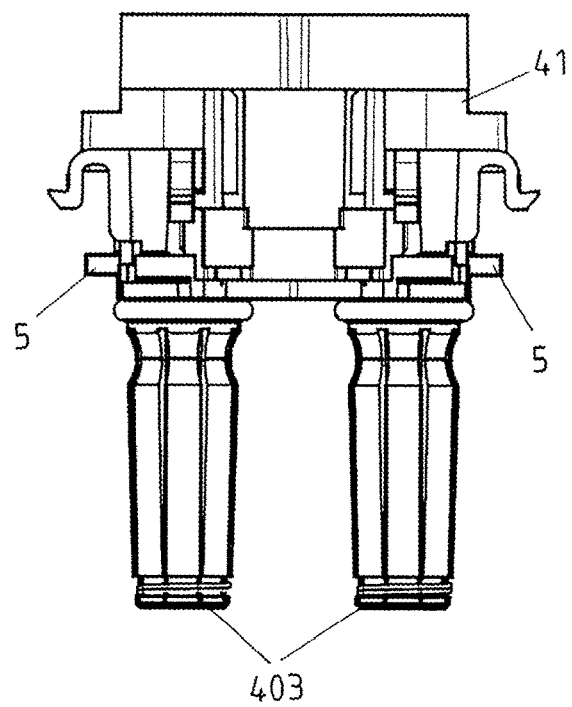
FIG. 6 a top view of the assembly.

In the case of a connector part 4 in the form of a vehicle inlet shown in FIG. 2 in an overall view, a contact carrier 41 shown in FIGS. 3 to 6 is arranged on a housing part 40. The housing part 40 has plug sections 400, 401 which can be plugged into an associated mating connector part, for example a charging plug.

The plug sections 400, 401 have a number of axially extending contact elements 402, 403 defining an insertion direction. By plugging in connectors with the associated mating connector part, the contact elements 402, 403 are electrically contacted with associated mating contact elements of the mating connector part, so that electrical contacting between the connector part 4 and the mating connector part is established and, for example, charging currents can be transmitted for charging.

The contact carrier 41 illustrated in FIGS. 3 to 6 has fastening points 410, 411 to which the contact elements 402, 403 are to be fastened and, when the contact carrier 41 is attached to the housing part 40, are held relative to the plug sections 400, 401. The contact elements 402 assigned to the upper plug section 400, which realize an earthing contact and signal contacts, are to be arranged at the upper fastening points 410. In contrast, the contact elements 403 assigned to the lower plug section 401 are fastened at lower fastening points 411 and serve as load contacts for transmitting a charging current in the form of a direct current.

The contact carrier 41 provides a pre-assembled subassembly via which the contact elements 402, 403 are combined and which can be fastened to the housing part 40 of the connector part 4 as a contact insert.

The contact elements 403 serving as load contacts are each assigned a temperature monitoring device 5 which serves to detect a heating on the associated contact element 403 and is attached to the contact element 403 for this purpose. The temperature monitoring device 5 has a carrier element 50 in the form of a circuit board extending flat along a plane E, on which a sensor device is arranged and which is mechanically held on the associated contact element 403.

In the exemplary embodiment shown, each contact element 403 is assigned its own temperature monitoring device 5. The temperature monitoring device 5 is fixed with its carrier element 50 to the associated contact element 403, but not—with the exception of an elastic preload via a spring element 42—on the contact carrier 41 and also not on the housing part 40, so that the temperature monitoring device 5 is not in a power transmission line between the contact element 403 and the contact carrier 41 and the housing part 40, and thus load forces acting on the contact element 403 or the housing part 40 do not lead to (appreciable) loading on the temperature monitoring device 5.

Each temperature monitoring device 5 is elastically supported relative to the contact carrier 41 via a spring element 42 and is pressed via the spring element 42 within the plane E in the direction of the respectively associated contact element 403. The spring element 42 thus effects an elastic preload on the carrier element 50 of the temperature monitoring device 5 which brings about a mechanically secure hold of the temperature monitoring device 5 on the associated contact element 403 along with favorable thermal coupling.

Figure 7A:
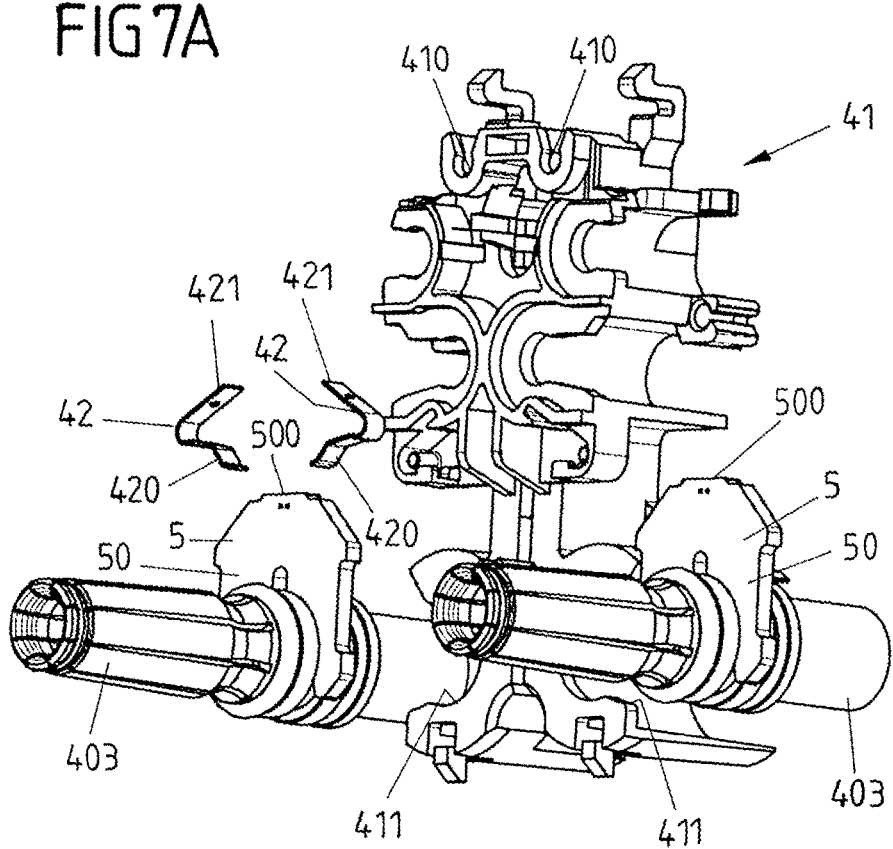
FIG. 7A a view of the assembly prior to attaching the contact elements to the contact carrier.
Figure 7B:
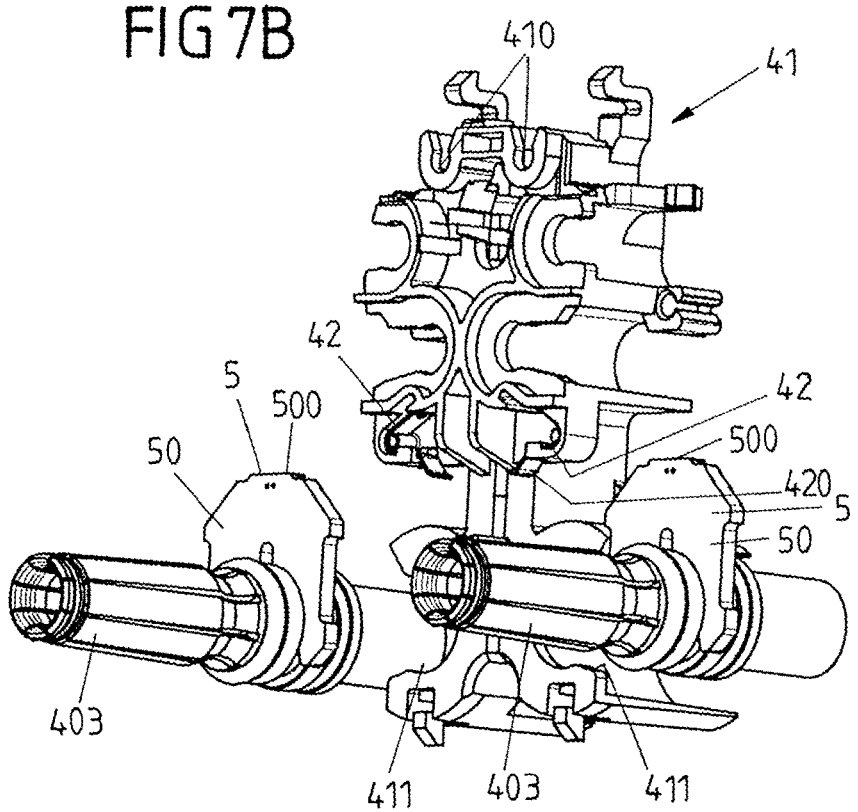
FIG. 7B a view of the assembly with spring elements attached to the contact carrier.
Figure 7C:
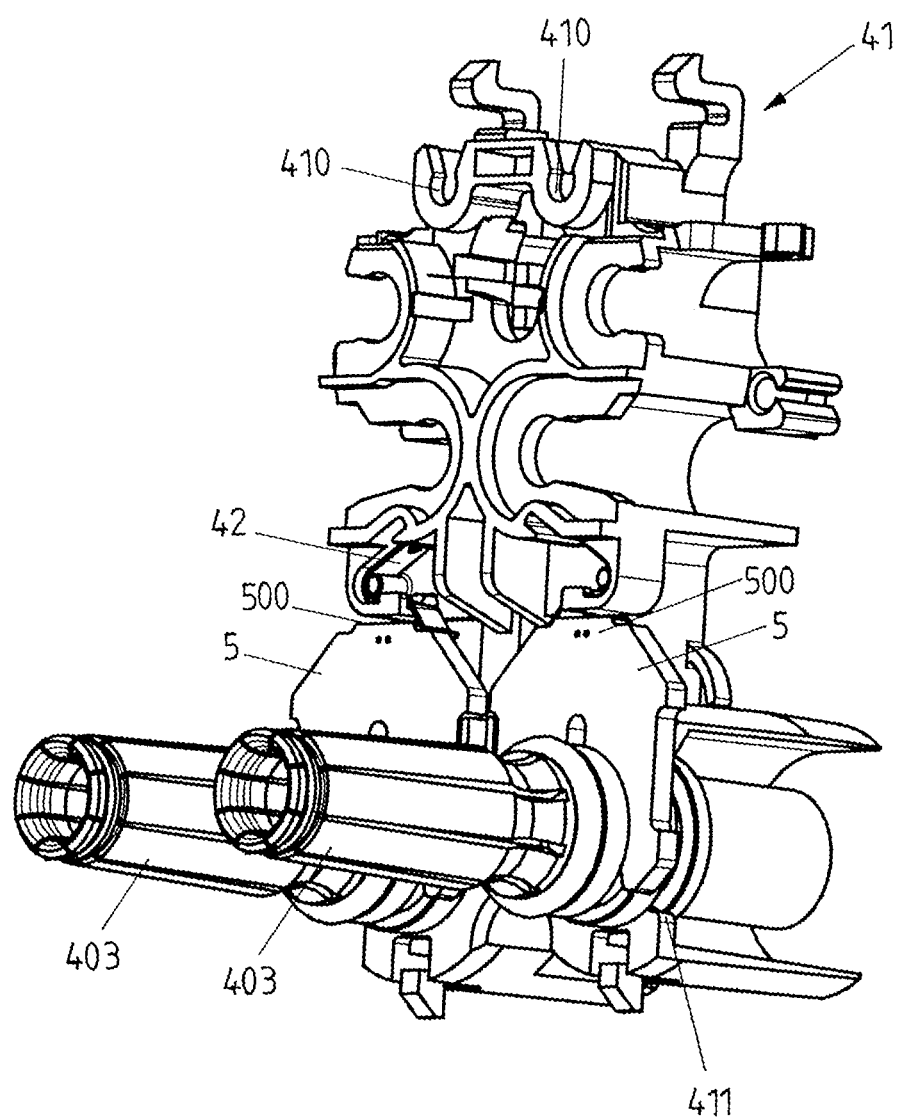
FIG. 7C a view of the assembly with contact elements arranged on the contact carrier.

For mounting the contact elements 403 on the contact carrier 41, as shown in the sequence of FIGS. 7A to 7C, the temperature monitoring devices 5 are first attached to the contact elements 403 and the spring elements 42 are arranged on the contact carrier 41 as can be seen in the transition from FIG. 7A to FIG. 7B. Then, as depicted in FIG. 7C, the contact elements 403 with the temperature monitoring devices 5 arranged thereon are arranged at the fastening points 411 of the contact carrier 41 and are mechanically fastened the contact carrier 41 above them.

The spring elements 42 are formed by leg springs which are each supported by a first leg 420 on the carrier element 50 of the associated temperature monitoring device 5 and are held on the contact carrier 41 via a second leg 421. Via the first spring legs 420, the spring elements 42 act on head sections 500 on the upper side of the support elements 50 of the temperature monitoring devices 5 and thus press the temperature monitoring devices 5 in the direction of the contact elements 403.

Figure 8:
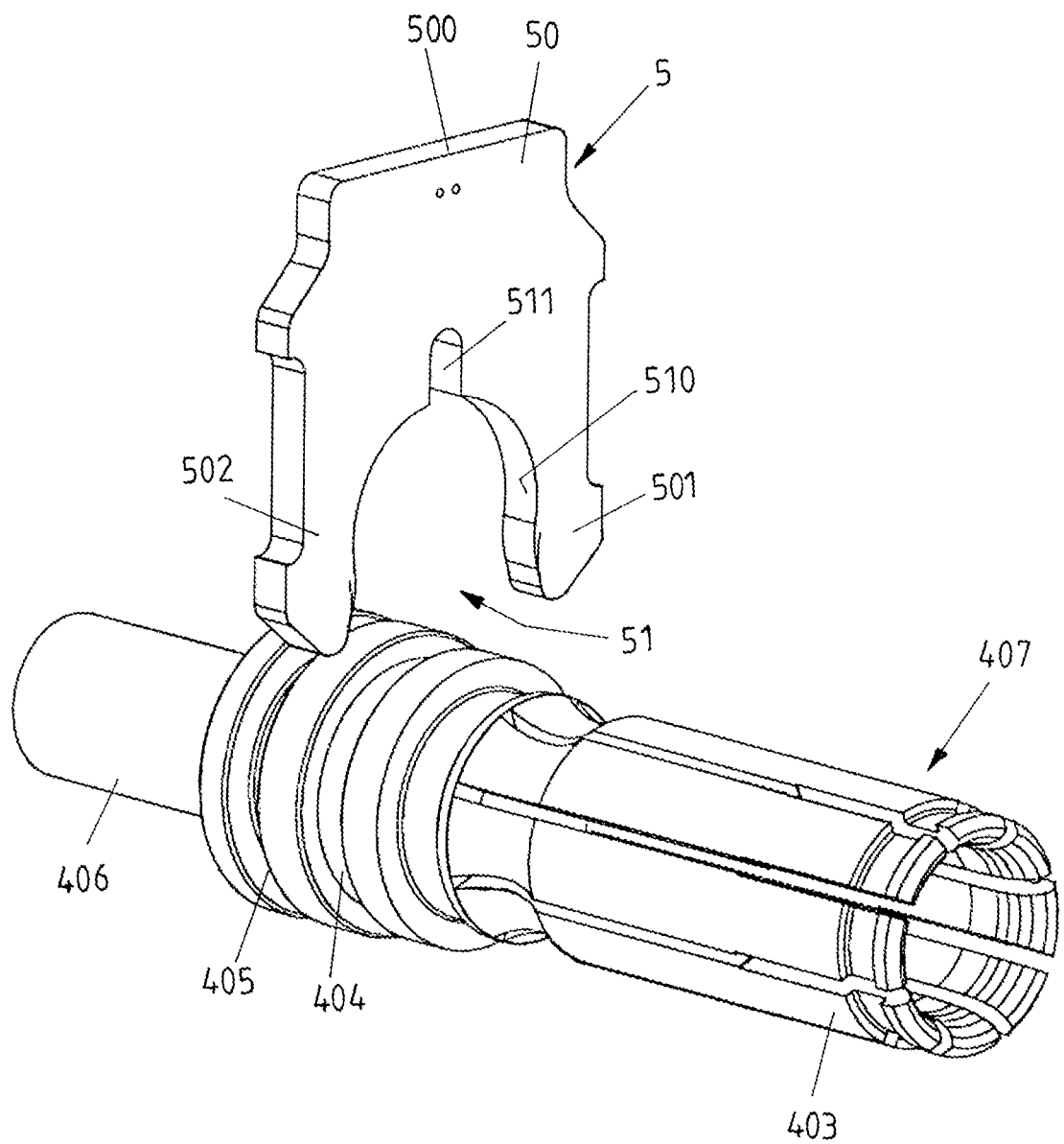
FIG. 8 a separate view of a contact element with an associated temperature monitoring device.

FIGS. 8 to 10 show separate views of a contact element 403 with an associated temperature monitoring device 5. The temperature monitoring device 5 has a support element 50 formed by a circuit board on which two clip arms 501, 502 are formed, which form an opening 51 with a circular arc-shaped edge region 510 between them. For fastening the temperature monitoring device 5 to the contact element 403, the carrier element 50 with the clip arms 501, 502 is inserted into a circumferential fastening groove 404 of the contact element 403, which is cylindrical in its basic shape, so that, as can be seen from FIGS. 9 and 10, the temperature monitoring device 5 is held in clipping manner on the contact element 403 via the clip arms 501, 502.

The carrier element 50 has a relief recess 511 extending from the opening 51 and extending into the carrier element 50. The relief recess 511 can, for example, be milled into the carrier element 50 and serves to adjust the elasticity at the clip arms 501, 502 in such a way that in the assembled position the clip arms 501, 502 engage around the contact element 503 and thereby rest against the contact element 403 in an elastically preloaded manner, so that firstly a fixed mechanical hold and secondly a good thermal coupling between the carrier element 50 and the contact element 403 is created.

The contact element 403 has a further fastening groove 405 which is offset axially relative to the fastening groove 404 and via which the contact element 403 is to be arranged at the associated fastening point 411 of the contact carrier 41. A cylinder shaft 406, via which an electrical load line can be connected to the contact element 403, axially adjoins the fastening groove 405. At the other opposite end, the contact element 403 forms a contact section 407 in the form of a contact jack formed by contact lamellae, into which an associated contact plug of a mating connector part can be inserted.

Figure 11:
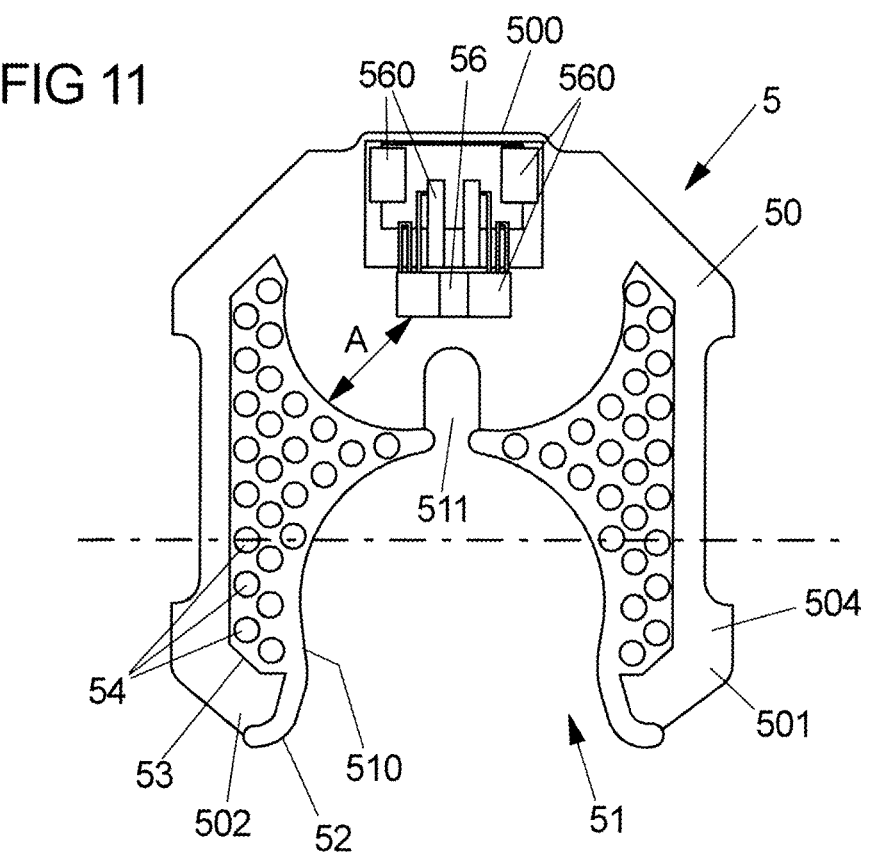
FIG. 11 a view of a temperature monitoring device having a first thermally conductive layer arranged on a surface of a carrier element.
Figure 12:
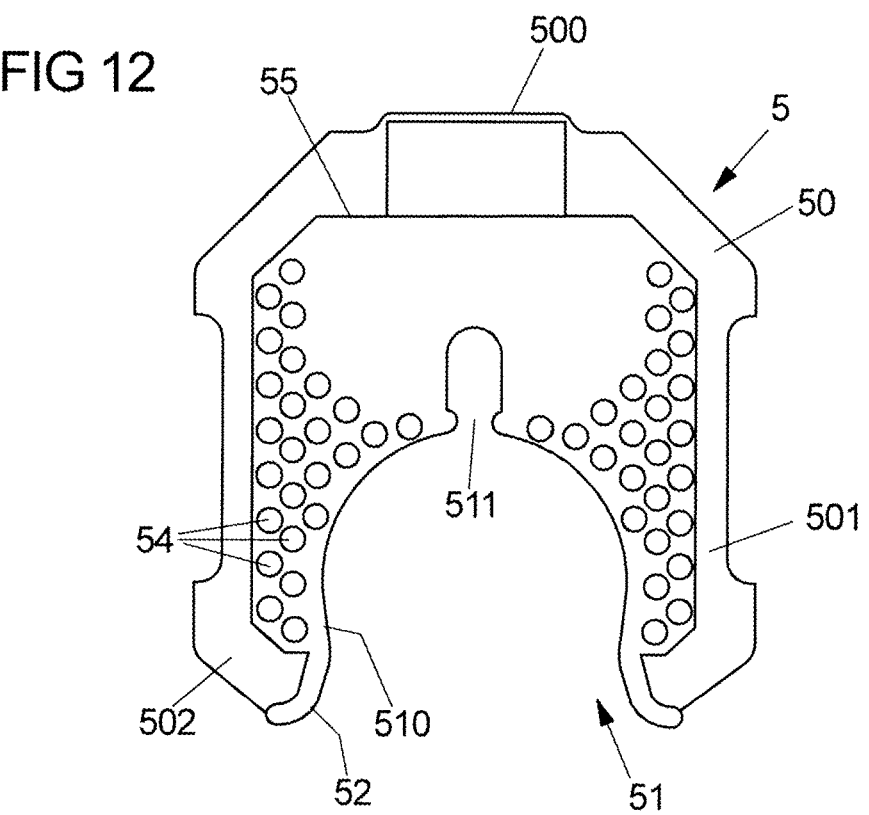
FIG. 12 is a view of a second thermally conductive layer embedded in a base body of the carrier element of the temperature monitoring device.
Figure 13:
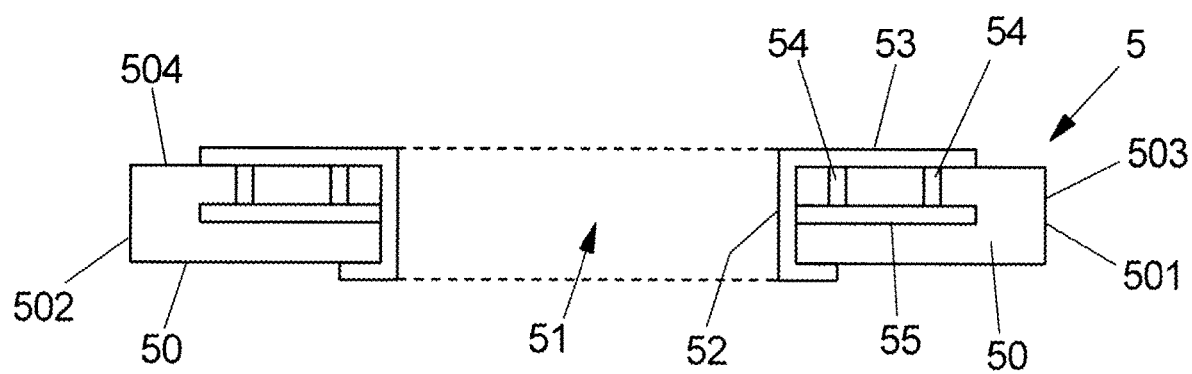
FIG. 13 a schematic sectional view taken along the line I-I according to FIG. 11.

In a exemplary embodiment shown in FIGS. 11 to 13, the carrier element 50 of the temperature monitoring device 5 is formed by a multilayer circuit board, in which the edge region 510 of the opening 51 is covered by a metalization layer 52 and in which thermally conductive metal layers (e.g. copper layers) extend on a surface 504 of a base body 503 and inside the base body 503. A sensor device 56 is arranged on the surface 504 and serves to detect heating at the contact element 403, to which the temperature monitoring device 5 is attached.

A first thermally conductive layer 53, depicted in FIG. 11, extends along the surface 504 of the carrier element 50 in this embodiment. The thermally conductive layer 53 is connected to the metalization layer 52 and is spaced apart from the sensor device 56 by a distance A and thereby electrically insulated from the sensor device 56.

A second thermally conductive layer 55 extends inside the base body 503, as depicted in FIG. 12 and shown in FIG. 13, which is thermally coupled to the first thermally conductive layer 53 via a plurality of heat vias 54 and is also connected to the metalization layer 52 at the edge region 510 of opening 51. The second thermally conductive layer 55 extends to below the sensor device 56 but is electrically insulated from the sensor device 56 via the base body 503 made of an electrically insulating material (for example FR4).

When the contact element 403 associated with the temperature monitoring device 5 heats up, the heat produced on the contact element 403 is directly absorbed via the metalization layer 52 and the thermally conductive (metal) layers 53, 55 and leads to uniform heating of the thermally conductive layers 53, 55 thermally coupled to one another via the heat vias 54. In doing so, the heat is transported via the second thermally conductive layer 55 embedded in the base body 503 to below the sensor device 56, so that the heating can be detected directly at the sensor device 56 and thus the heating at the contact element 403 can be detected without a large time delay.

The sensor device 56 is thus reliably electrically insulated from the contact element 403, in particular via the distance A from the first heat-conducting layer 53 and via the base body 503 from the second heat-conducting layer 55. In addition, the sensor device 56 is located so close to the second thermally conductive layer 55 that heating can be directly absorbed at the contact element 403 and thus at the second thermally conductive layer 55.

The sensor device 56 is connected to metalization sections 560 on the surface 504 of the base body 503. In particular, lines (see also e.g. FIG. 14 for this purpose) can be connected to the sensor device 56 via the metalization sections 560.

Figure 14:
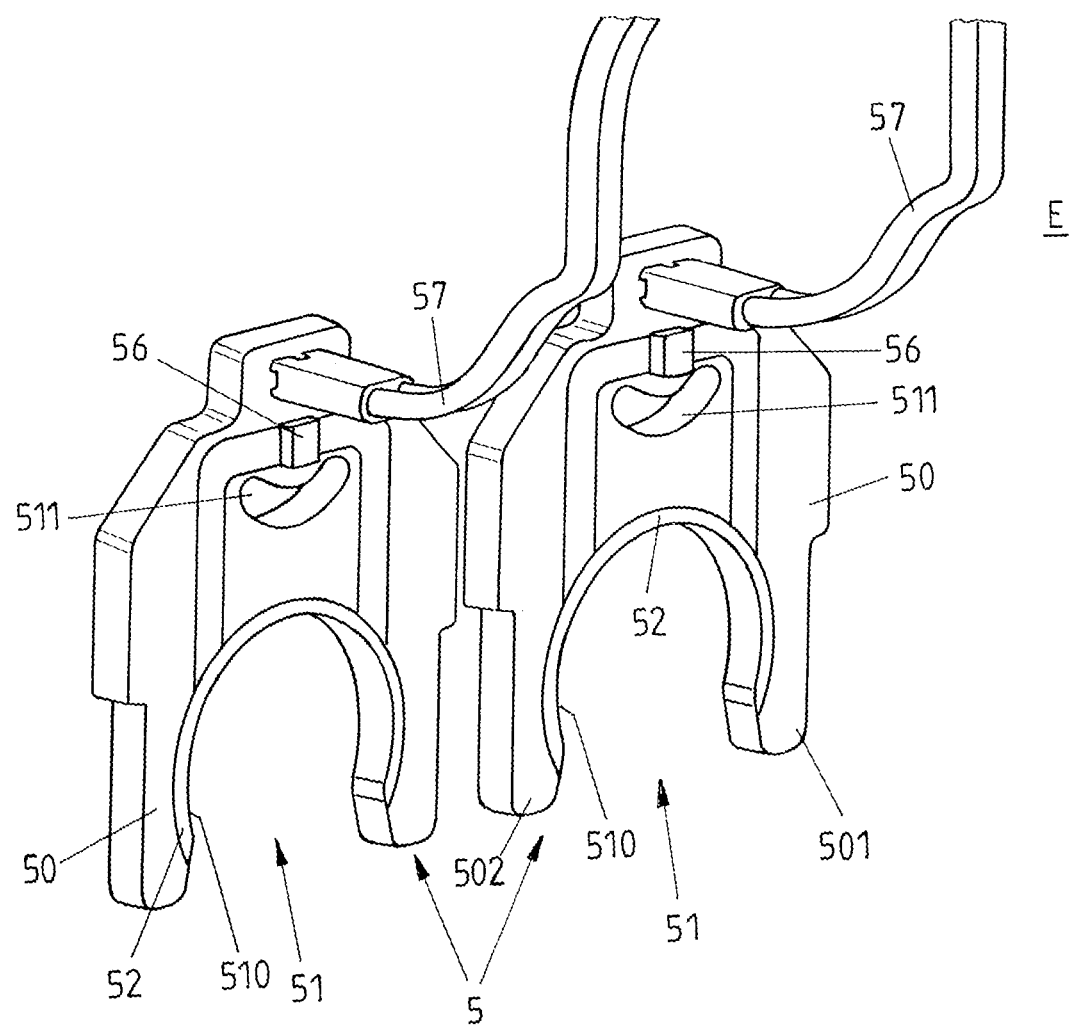
FIG. 14 a view of another exemplary embodiment of two temperature monitoring devices.

In the exemplary embodiment of the temperature monitoring device 5 shown in FIGS. 11 to 13, the relief recess 511 is formed into the carrier element 50 starting from the opening 51. In contrast, in an exemplary embodiment depicted in FIG. 14, relief recesses 511 are arranged in the interior of the carrier elements 50 of the temperature monitoring devices 5 and are thus surrounded by the carrier element 50 when viewed along the plane E, so that a closed contour results around each relief recess 511. FIG. 14 additionally shows a connecting line 57 at each temperature monitoring device 5 which is connected to the sensor device 56 for transmitting sensor signals.

Apart from that, the exemplary embodiment of FIG. 14 is essentially functionally identical to the exemplary embodiment according to FIGS. 11 to 13, so that reference is made to the preceding embodiments.

Figure 15:
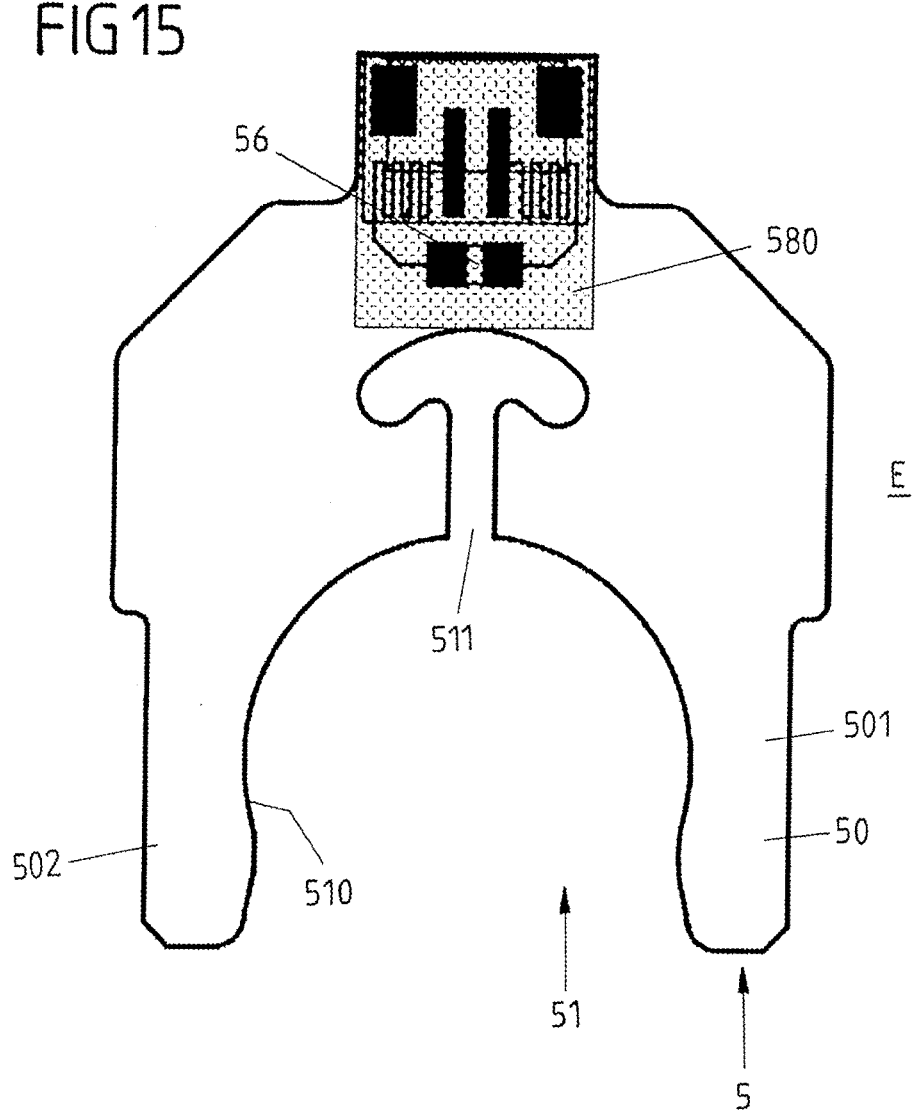
FIG. 15 a view of another embodiment of a temperature monitoring device having a carrier element made of a metal core circuit board.
Figure 16:
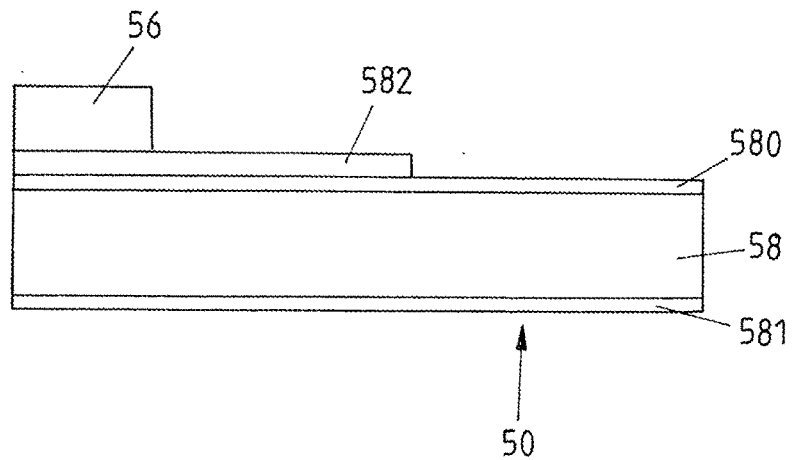
FIG. 16 a schematic view of the structure of a metal core circuit board.

In an exemplary embodiment illustrated in FIG. 15, the carrier element 50 of the temperature monitoring device 5 is formed by a so-called metal core circuit board which comprises a metal core 58 made of aluminum, for example, as schematically depicted in FIG. 16. The metal core 58 is completely or partially covered, on one side or on both sides, by insulating layers 580, 581 so that the metal core 58 is in particular electrically insulated from a sensor device 56 arranged on the carrier element 50. Via an electrically conductive (metal) layer 582 the sensor device 56 can be connected, for example, to lines and through them to a control device.

In this exemplary embodiment, the carrier element 50 is directly connected via the metal core 58 to the contact element 403 and is thus thermally coupled. The heat is conducted directly under the sensor device 56 via the (highly thermally conductive) metal core 58, so that heating can be detected at the sensor device 56 without a large delay in time.

The clip arms 501, 502 are formed by the metal core circuit board in this embodiment. A relief recess 511 extends from the opening 51 (viewed in plane E) into the metal core circuit board.

The idea underlying the invention is not limited to the exemplary embodiments described above, but can also be realized in a similar manner in conjunction with completely differently designed embodiments.

In principle, a connector part of the type described here can not only be used as a charging plug or charging socket in a charging device for charging an electric vehicle, but can also be used in a variety of ways on a wide variety of different devices wherever monitoring of heating on a contact element is required.

A connector part of the type described here can in principle have one or more contact elements. One or more sensor devices can be used to monitor heating.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Vehicle
2 Charging station
2 Charging cable
30, 31 Charging plug
4 Connector part
40 Housing part
400, 401 Plug section
402, 403 Contact element
404 Groove
405 Groove
406 Cylindrical shaft
407 Contact portion
41 Contact carrier
410, 411 Fastening points
42 Spring element
420, 421 Legs
5 Temperature monitoring device
50 Carrier element (circuit board)
500 Head section
501, 502 Clip arm
503 Base body 504 Surface
51 Receiving opening
510 Edge section
511 Relief recess
52 Metallization layer
53 Conductive layer
54 Heat via
55 Conductive layer
56 Temperature sensor
560 Metalization sections
57 Connection line
58 Metal core
580, 581 Insulating layer
582 Conductive layer
A Distance
E Plane

The invention claimed is:

1. A connector part for connecting to a mating connector part, comprising:
   a housing part;
   an electrical contact element arranged on the housing part configured to make electrical contact with the mating connector part; and
   a temperature monitoring device comprising a sensor device configured to detect a heating on the contact element,
   wherein the temperature monitoring device further comprises a carrier element which extends flatly along a plane, on which the sensor device is arranged, and which has two clip arms via which the carrier element is clippable onto the contact element,
   wherein the clip arms form between them an opening having an edge portion embracing the contact element,
   wherein the edge region is at least partially covered by a metallization layer,
   wherein the carrier element has a base body comprising an electrically insulating material and at least one electrically conductive thermally conductive layer contacted with the metallization layer, and
   wherein the connector part further comprises a first thermally conductive layer disposed on a surface of the base body and a second thermally conductive layer embedded in the base body.

2. The connector part according to claim 1, wherein the clip arms are integrally formed with the carrier element.

3. The connector part according to claim 1, wherein the edge portion extends along an arc of a circle.

4. The connector part according to claim 3, wherein the first thermally conductive layer and the second thermally conductive layer are thermally interconnected via heat vias.

5. The connector part according to claim 3, wherein the first thermally conductive layer, which is arranged on the surface, is spaced apart by a distance from the sensor device, which is also arranged on the surface of the base body.

6. The connector part according to claim 3, wherein the second thermally conductive layer extends in the base body to below the sensor device.

7. The connector part according to claim 1, wherein the carrier element comprises a metal core and at least one electrically insulating layer at least partially covering the metal core.

8. The connector part according to claim 1, wherein the carrier element has at least one relief recess for providing elasticity to the clip arms.

9. The connector part according to claim 8, wherein the relief recess extends from the opening into the carrier element.

10. The connector part according to claim 1, further comprising a contact carrier which is arranged on the housing part and on which the contact element is held together with the temperature monitoring device arranged thereon.

11. The connector part according to claim 10, wherein the carrier element is elastically supported on the contact carrier via a spring element.

12. The connector part according to claim 11, wherein the spring element has a first leg supported on the carrier element and a second leg supported on the contact carrier.

13. The connector part according to claim 11, wherein the spring element is configured to exert an elastic preload on the support element in the plane of the support element.

14. The connector part according to claim 1, further comprising a plurality of contact elements, on each of which a separate temperature monitoring device is arranged.

15. A connector part for connecting to a mating connector part, comprising:
    a housing part;
    an electrical contact element arranged on the housing part configured to make electrical contact with the mating connector part; and
    a temperature monitoring device comprising a sensor device configured to detect a heating on the contact element,
    wherein the temperature monitoring device further comprises a carrier element which extends flatly along a plane, on which the sensor device is arranged, and which has two clip arms via which the carrier element is clippable onto the contact element,
    wherein the carrier element has at least one relief recess for providing elasticity to the clip arms, and
    wherein the relief recess extends from the opening into the carrier element.

16. A connector part for connecting to a mating connector part, comprising:
    a housing part;
    an electrical contact element arranged on the housing part configured to make electrical contact with the mating connector part; and
    a temperature monitoring device comprising a sensor device configured to detect a heating on the contact element,
    wherein the temperature monitoring device further comprises a carrier element which extends flatly along a plane, on which the sensor device is arranged, and which has two clip arms via which the carrier element is clippable onto the contact element,
    wherein the connector part further comprises a contact carrier which is arranged on the housing part and on which the contact element is held together with the temperature monitoring device arranged thereon,
    wherein the carrier element is elastically supported on the contact carrier via a spring element, and
    wherein the spring element is configured to exert an elastic preload on the support element in the plane of the support element.

* * * * *